3,729,378
PROCESS FOR THE PRODUCTION OF
AERUGINOIC ACID
Tomio Imai, Tokyo, Masao Takahashi, Matsudo, Nobuyuki Seki, Soka, and Yoshio Irie, Matsudo, Japan, assignors to Godo Shusei Kabushiki Kaisha, Tokyo, Japan
Filed June 1, 1970, Ser. No. 42,121
Claims priority, application Japan, Sept. 16, 1969, 44/72,757
Int. Cl. C12d 1/00
U.S. Cl. 195—28 R          5 Claims

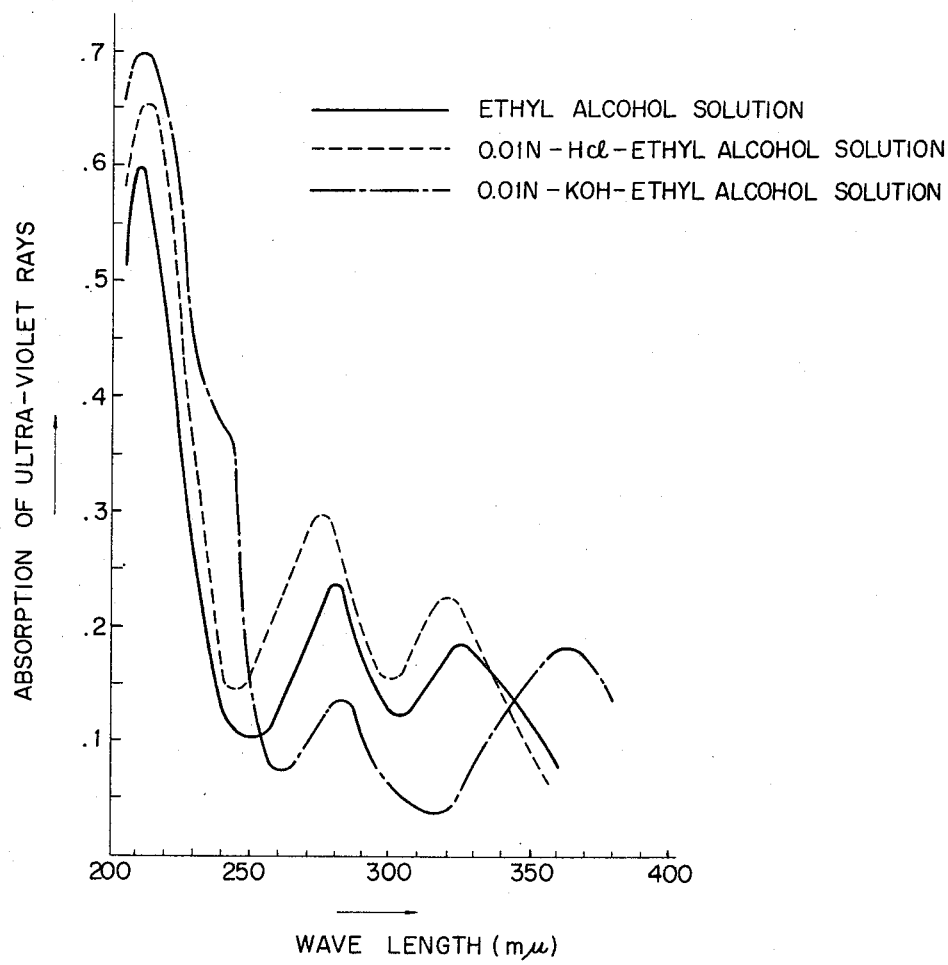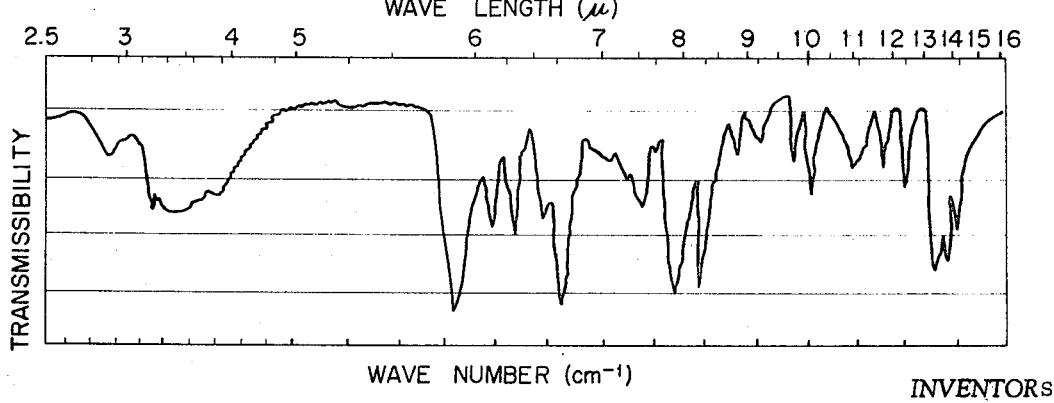

ABSTRACT OF THE DISCLOSURE

This invention relates to a process for the production of aeruginoic acid by culturing a strain of Pseudomonas aeruginosa or a variety of the strain or a variety of Pseudomonas aeruginosa having the ability for producing aeruginoic acid on a culture medium comprising as a principal component a carboneous source to produce a broth culture and recovering aeruginoic acid from said broth culture.

---

This invention relates to a process for the production of a new substance by culturing a strain of Pseudomonas aeruginosa or a variety of the strain or a variety of Pseudomonas aeruginosa having the ability for assimilating hydrocarbons, producing a broth culture containing said new substance which is named as aeruginoic acid by the inventors, and recovering said new substance from said broth culture.

The strain of Pseudomonas aeruginosa has been newly isolated by the inventors from the soil of oil-field and the strain has been numbered in the inventors' laboratory as the Pseudomonas aeruginosa, strain 1-7-2A. Also, the strain 1-7-2A has been deposited in the American Type Culture Collection as the ATCC number 21472.

The inventors have found that the Pseudomonas aeruginosa, strain ATCC 21472 or a variety of the strain ATCC 21472 which can be obtained from the strain ATCC 21472 by irradiating it with ultra-violet rays, X-rays or gamma-rays or treating it with nitrogen mustards or nitrous acid can be cultured on a culture medium comprising hydrocarbons for producing and accumulating an unknown acidic substance with high yield. This acidic substance has been named by the inventors as aeruginoic acid. It should be noted that this invention is based on the discovery of such a new aeruginoic acid.

Also, the inventors have found that the new acidic substance or the new aeruginoic acid has the antimicrobial activities against Botrytic cinerea, Xanthomonas oryzae, Candida albicans, Candida tropicalis, Penicillium crysogenum and Tricophytone mentagrophytes, and can display its anti-inflammatory activity against carrageenin edema or depression of the blood pressure of the human body as it acts on periphery blood vessels.

The process for the production of aeruginoic acid in accordance with this invention is characterized by using the Pseudomonas aeruginosa, strain ATCC 21472, or a variety of the strain ATCC 21472 having the ability for assimilating hydrocarbons and a culture medium comprising hydrocarbons, and producing a broth culture in which said aeruginoic acid is accumulated fermentation.

The culture medium used in this invention is modified and improved so that aeruginoic acid can be accumulated with high yield. For example, the culture medium comprises hydrocarbons, carbon and nitrogen sources, inorganic salts, nutrients for the growth of the strain and certain surface active agents.

The hydrocarbons which are used in this invention include petroleum distillates such as kerosene, light oil and heavy oil; crude oil, naphtha, natural gas, paraffin, olefine, alkane and other hydrocarbons.

The carbon sources which are used in this invention include hydrocarbons, fatty acids, glycerine, glucose, sucrose and molasses. The nitrogen sources used in this invention include inorganic ammonium salts, urea and ammonia.

The inorganic salts which are used in this invention include compounds containing phosphoric acid, sulfuric acid, manganese, iron, zinc and magnesium and the like.

The nutritious materials which are used in this invention include nucleic acid, its bases, vitamins, amins acids, dry yeast, yeast extracts, peptone, meat extracts, decomposed product of casein and natural organic substances such as a muddy product derived from a spent liquor of the alcohol distillation. Such a nutritious material can be used alone or in combination in a suitable amount depending on the conditions for cultivating the strain. When peptone is used, it is preferable to use it in an amount varying from 50 mg. to 200 mg. per 100 ml. of the culture medium. When peptone is used in an amount of below 50 mg./100 ml. of the culture medium or above of 200 mg./100 ml. of the culture medium, the production and accumulation of aeruginoic acid is decreased.

In accordance with this invention, the surface active agents are used for achieving the good contact between the culture medium and the strain used, and they are exemplified by certain non-ion surface active agents such as polyoxyethylene sorbitan monolaurate (refer to as Tween 20) and other polyoxyethylenic and sorbitanic agents.

In accordance with this invention, the cultivation of the strain is conducted under aeration with agitation and the culture medium is adjusted by adding an alkaline neutralizing agent such as calcium carbonate, an aqueous ammonia solution, sodium hydroxide or the like therein to have the pH values of 5 to 9. The cultivation of the strain is conducted at a temperature of 25° C. to 35° C. for a period of time varying from 48 hours to 120 hours. After incubation, aeruginoic acid can be separated from the broth culture in the same manner as in the conventional separating techniques using the difference of solubility, adsorption affinity, distribution ratio and crystallizability between the impurities and the intended product.

The physical and chemical properties of the aeruginoic acid produced in accordance with this invention are given as follows.

(1) CHEMICAL ANALYSIS

Found (percent): C, 54.02; H, 3.25; N, 6.38; S, 14.26. Calculated for $C_{10}H_7O_3NS$ (percent): C, 54.30; H, 3.19; N, 6.33; S, 14.47.

The molecular formula of aeruginoic acid is assumed on the basis of the elementary analysis and the molecular weight that it is indicated as $C_{10}H_7NO_3S$.

(2) MOLECULAR WEIGHT

Aeruginoic acid is mass-analyzed and determined that its molecular weight is 221.

(3) MELTING POINT

Aeruginoic acid is tested for its melting point by using the conventional techniques and it was found that the aeruginoic acid is sublimed at 207° C. and decomposed at 270° C.–271° C.

(4) ULTRA-VIOLET RAYS-ABSORPTION SPECTRUM

Aeruginoic acid is tested for its absorption spectrum by using the ultra-violet rays. The test results are given in the accompanying FIG. 1. In the FIG. 1, it shows that the ethyl alcohol solution containing the aeruginoic acid has the maximum absorption at 280 mμ and 324 mμ and the ethyl alcohol solution containing the aeruginoic acid and potassium hydroxide at the concentration of 0.01 Normal has the maximum absorption at 282 mμ and 362 mμ, and the shoulder absorption at 240 mμ. Also, the FIG. 1 shows that the ethyl alcohol solution containing the aeruginoic acid and hydrochloric acid at the concentration of 0.01 Normal has the maximum absorption at 276 mμ and 320 mμ.

(5) INFRA-RED-ABSORPTION SPECTRUM

Aeruginoic acid is tested for its absorption spectrum by using the infra-red rays in the same manner as in the potassium bromide-disk method. The test result is given in the accompanying FIG. 2. The FIG. 2 shows that the infra-red absorption occurs at the wave numbers of 3120 cm.$^{-1}$, 2650 cm.$^{-1}$, 1690 cm.$^{-1}$, 1620 cm.$^{-1}$, 1484 cm.$^{-1}$, 1265 cm.$^{-1}$ or 1215 cm.$^{-1}$.

(6) SOLUBILITY

Aeruginoic acid is hardly dissolved in water and petroleum ether but it is soluble in ether, ethyl acetate, chloroform, acetone, ethyl alcohol, methyl alcohol and an alkaline aqueous solution containing ammonia, sodium bicarbonate or sodium carbonate.

(7) COLOR REACTION

Aeruginoic acid is positive for the ferric chloride reaction and the Folin-Pauly reaction.

(8) DISTINGUISH ALKALINITY FROM ACIDITY OR NEUTRALITY

Aeruginoic acid is dissolved in ethyl alcohol and the resultant ethyl alcohol solution indicates the acidity .

(9) COLOR AND STATE

Aeruginoic acid is a yellowish white and needle-like crystal.

Still further, the aeruginoic acid is tested for its properties by using various chromatographies. Namely, it is subjected to the paper-chromatography by using a developing solvent such as a mixture of a buffer solution containing 1.5 N-ammonium carbonate-ammonia, normal butanol and benzene in the ratio of 3:16:1 or a mixture of said buffer solution, normal butanol and methyl alcohol in the ratio of 3:16:15 or a normal butanol solution in which said buffer solution is saturated, and it was found that the yellowish green fluorescent is formed with the values of $R_f$=0.15, 0.45 and 0.16 respectively. When the aeruginoic acid is subjected to the thin-layer chromatography by using a mixture of toluene, ethyl formate and formic acid in the ratio of 5:4:1 as a developing solvent, it was found that the $R_f$ value is 0.70. When these chromatographic images are sprayed with a solution containing ferric chloride, they are changed to the bluish-purple color.

From the physical and chemical properties as mentioned above, the inventors have decided that aeruginoic acid is a new substance.

This invention is illustrated by the following examples.

Example 1

The *Pseudomonas aeruginosa*, strain 1–7–2A which has been deposited in the American Type Culture Collection as the ATCC number 21472 was cultured on a culture medium containing 2% of kerosene, 0.3% of ammonium nitrate, 0.15% of $KH_2PO_4$, 0.05% of $K_2HPO_4$, 0.05% of magnesium sulfate and 1% of peptone and having the pH values of 7 at 30° C. for 48 hours under shaking for producing a seed culture.

In accordance with the fermentation of this invention, there was prepared a culture medium comprising 2% of kerosene, 0.3% of ammonium nitrate, 0.15% of $H_2KPO_4$, 0.05% of $K_2HPO_4$, 0.05% of magnesium sulfate, 0.1% of peptone and 0.05% of Tween 20. One liter of the culture medium was placed in a 5 liter-Erlenmeyer's flask and the content of said flask was sterilized at 110° C. for 20 minutes and adjusted to the pH values of 7. Then, the content of the Erlenmeyer's flask was incubated with the seed broth culture in the amount of 50 milliliters per one liter of the content and the resultant mixture was shaken by rotating the flask at the speed of 200 r.p.m. for 120 hours while the mixture was kept at 30° C. for producing a broth culture. In such a cultivation. it was found that the broth culture tends to decrease the pH values and therefore it was adjusted to have the pH values of 7 by adding the aqueous ammonia solution at intervals of 24 hours without contamination with bacteria. Then the broth culture was filtered for obtaining 25 grams of a wet and strain-containing cake and 900 milliliters of a filtrate.

The strain-containing cake was extracted with 200 milliliters of methanol to produce an extract and the extract was concentrated under the reduced pressure. 1.8 grams of the resultant concentrate was dissolved in 50 milliliters of ether and an ether layer was separated from impurities by filtration. Then, the ether layer was extracted with 50 milliliters of a 1% aqueous solution containing sodium bicarbonate. Such an extracting procedure was conducted once more and two extracts were combined and then the combined extract was adjusted to have the pH values of 2.0 and extracted in twice with 100 milliliters of ether to produce an ether layer respectively and the combined ether layer was evaporated under the reduced pressure to dryness. The dry product was dissolved in 2 millimeters of a diluted aqueous ammonia solution and adjusted to have the pH values of 2.0 by adding 6 N-hydrochloric acid. The resultant solution was allowed to cool for producing crystals and then the crystals were isolated by filtration and dried for obtaining 2 milligrams of the yellowish brown powder as the crude crystals of aeruginoic acid.

Example 2

This example was conducted by using the 900 milliliters of the filtrate which was produced in Example 1. Namely, the filtrate was concentrated under the reduced pressure to 100 milliliters and the concentrate was extracted with 100 milliliters of ether until 300 millimeters of an ether extract were obtained. Then, the 300 milliliter ether extarct was extracted with 200 milliliters of a 1% aqueous solution containing sodium bicarbonate and the resultant extract was adjusted to have the pH values of 2.0 by using 6 N-hydrochloric acid, and then it was again extracted with 200 milliliters of ether. The resultant ether extract was evaporated under the reduced pressure to dryness for obtaining 2 grams of a dry product. The dry product was dissolved in one milliliter of an admixture containing toluene and ethyl formate in the ratio of 5:4. The The resultant solution was adsorbed on 30 grams of a silica gel and the adsorbed silica gel was chromatographically developed with a solution containing toluene, ethyl formate and formic acid in the ratio of 5:4:1 and the effective portions were collected and concentrated to produce crystals. The crystals were isolated by filtration and dried for obtaining 45 milligrams of yellowish white crystals.

What we claim is that:

1. A process for the production of aeruginoic acid which comprises culturing the strain *Pseudomonas aeruginosa* ATCC 21472 or mutant thereof, said strain or variety thereof having the ability to assimilate hydrocarbons, on a culture medium comprising hydrocarbons, nitrogen sources, inorganic salts, and nutritious materials necessary for the growth of said strain or variety thereof and a surface active agent;

producing a broth culture containing said aeruginoic acid; and separating said aeruginoic acid from said broth culture.

2. A process for the production of aeruginoic acid as claimed in claim 1, wherein the culture medium is adjusted to have the pH values of 5 to 9, and the cultivation of the strain is conducted at a temperature of 25° C. to 35° C. for a period of time varying from 48 hours to 120 hours.

3. A process according to claim 1 wherein the strain ATCC 21472 is employed.

4. A process according to claim 1 wherein a mutant of ATCC 21472 is employed.

5. A process according to claim 4 wherein said mutant is obtained by irradiating ATCC 21472 with ultraviolet rays, X-rays or gamma rays or by treating ATCC 21472 with nitrogen mustards or nitrous acid.

References Cited

Koronelli et al.: Chem. Abs., vol. 69, #653306, 1968.

LIONEL M. SHAPIRO, Primary Examiner

GARY M. NATH, Assistant Examiner